United States Patent
Norkus et al.

[19]

[11] Patent Number: 6,113,084
[45] Date of Patent: Sep. 5, 2000

[54] JOUNCE BUMPER ASSEMBLY

[75] Inventors: James F. Norkus; William J. Curley, Jr, both of Waterbury, Conn.

[73] Assignee: Illinois Tool Works, Glenview, Ill.

[21] Appl. No.: 09/157,148

[22] Filed: Sep. 18, 1998

[51] Int. Cl.$^7$ ................................ B60G 11/22; F16F 1/36
[52] U.S. Cl. ...................... 267/292; 267/140; 267/153; 267/141.4; 267/141
[58] Field of Search ........................ 267/153, 141–141.7, 267/292, 293, 294, 33, 140, 219, 220; 248/615, 616, 634, 356; 403/225–228; 293/136, 155

[56] References Cited

U.S. PATENT DOCUMENTS

| | | | |
|---|---|---|---|
| 1,939,848 | 12/1933 | Haushalter | 267/141 |
| 2,596,780 | 5/1952 | Meyers et al. | 267/140 |
| 2,993,673 | 7/1961 | Villar | 267/141 |
| 3,606,295 | 9/1971 | Appleton | 267/141.1 |
| 3,825,292 | 7/1974 | Nakamura et al. | 267/140 |
| 4,198,037 | 4/1980 | Anderson | 267/294 |
| 4,256,292 | 3/1981 | Sullivan, Jr. et al. | |
| 4,805,886 | 2/1989 | Hassan . | |
| 5,419,539 | 5/1995 | Bressler | 267/292 |
| 5,467,970 | 11/1995 | Ratu et al. | 267/153 |
| 5,725,203 | 3/1998 | Lloyd | 267/153 |

FOREIGN PATENT DOCUMENTS

| | | | |
|---|---|---|---|
| 237444 | 10/1960 | Australia | 267/141.5 |
| 6159417 | 6/1994 | Japan | 267/141.1 |

*Primary Examiner*—Douglas C. Butler
*Attorney, Agent, or Firm*—St. Onge, Steward, Johnston & Reens LLC

[57] ABSTRACT

A jounce bumper assembly for cushioning the impact between two components of an automotive suspension system is provided. The jounce bumper assembly includes a mounting plate with at least one, but preferably two, substantially tubular proturbances protruding from a face thereof. A bumper is molded from a microcellular polymeric material around the mounting plate such that the ends of the proturbances extend out from the bumper. The bumper is disposed within a mounting cup having a recess sized and shaped to receive the bumper. The recess has holes passing therethrough corresponding to the proturbances such that the ends of the proturbances pass through the holes. The ends of the proturbances passing through the holes are deformed radially outwardly such that the bumper is fixed within the recess of the mounting cup. A method of manufacturing such a jounce bumper assembly is also provided.

12 Claims, 2 Drawing Sheets

JOUNCE BUMPER ASSEMBLY

FIELD OF THE INVENTION

The present invention relates to an automotive suspension system, and more particularly to a jounce bumper assembly for cushioning the impact between two components of an automotive suspension system. In another aspect, the present invention relates to a method of manufacturing such a jounce bumper assembly.

BACKGROUND OF THE INVENTION

Jounce bumpers for use in motor vehicle suspension systems are well known. Such devices have long been used for cushioning the impact between two suspension system components, such as the axle and a portion of the frame. To this end the jounce bumper, which includes a resilient material, is attached to the suspension system at a point where impact is likely to occur when the shock absorber fails to absorb the forces created by extraordinary driving conditions. The jounce bumper serves to cushion the impact, thereby reducing noise, the feel of the impact by the driver, and possible damage to the suspension system. However, although such devices are known, certain deficiencies in the prior art exist.

Referring to FIG. 1, an example of a prior art jounce bumper assembly is shown. The jounce bumper assembly 100 comprises a mounting cup 102 sized and shaped to receive a resilient bumper 104. A plurality of stamped fingers 106 in the side walls 108 of mounting cup 102 are pressed into bumper 104 to retain bumper 104 in mounting cup 102. A disadvantage of such a design is that side walls 108 of mounting cup 102 must have a depth great enough to provide fingers 106 of a sufficient length to retain bumper 104 in mounting cup 102. There may not, however, be enough space available between the suspension system components to allow for the use of such a deep mounting cup. Another disadvantage of this prior art design is the stresses on jounce bumper assembly 100 caused by repeated impacts may cause bumper 104 to deform and eventually pull out of mounting cup 102. This is particularly true when the depth of mounting cup 102 is shallow relative to its width.

What is desired, therefore, is a jounce bumper assembly for cushioning the impact between two components of an automotive suspension system, which can be disposed between suspension system components even when little space is provided therebetween, and which can withstand the stresses associated with repeated impacts.

SUMMARY OF THE INVENTION

Accordingly, it is an object of the present invention to provide a jounce bumper assembly which cushions the impact between two components of an automotive suspension system.

Another object of the present invention to provide a jounce bumper assembly having the above characteristics and which can be disposed between suspension system components even when little space is provided therebetween.

A further object of the present invention is to provide a jounce bumper assembly having the above characteristics and which can withstand the stresses associated with repeated impacts.

These and other objects of the present invention are achieved by provision of a jounce bumper assembly having a mounting plate with at least one, but preferably two, substantially tubular proturbances protruding from a face thereof. A bumper is molded from a microcellular polymeric material around the mounting plate such that the ends of the proturbances extend out from the bumper. The bumper is disposed within a mounting cup having a recess sized and shaped to receive the bumper. The recess has holes passing therethrough corresponding to the proturbances such that the ends of the proturbances pass through the holes. The ends of the proturbances passing through the holes are deformed radially outwardly such that the bumper is fixed within the recess of the mounting cup.

Preferably the mounting plate has a plurality of holes passing therethrough, which aid in molding the bumper therearound and which act to strengthen the attachment between the bumper and the mounting plate. The mounting plate also preferably has a plurality of protrusions on the face thereof, the plurality of protrusions being encased within the bumper to further strengthen the attachment. Also preferably, the microcellular polymeric material of which the bumper is formed is microcellular urethane. The preferred methods for deforming the ends of the proturbances radially outwardly are orbital spinning or cold staking.

The invention and its particular features and advantages will become more apparent from the following detailed description considered with reference to the accompanying drawings.

DETAILED DESCRIPTION OF THE INVENTION

Figure 1:
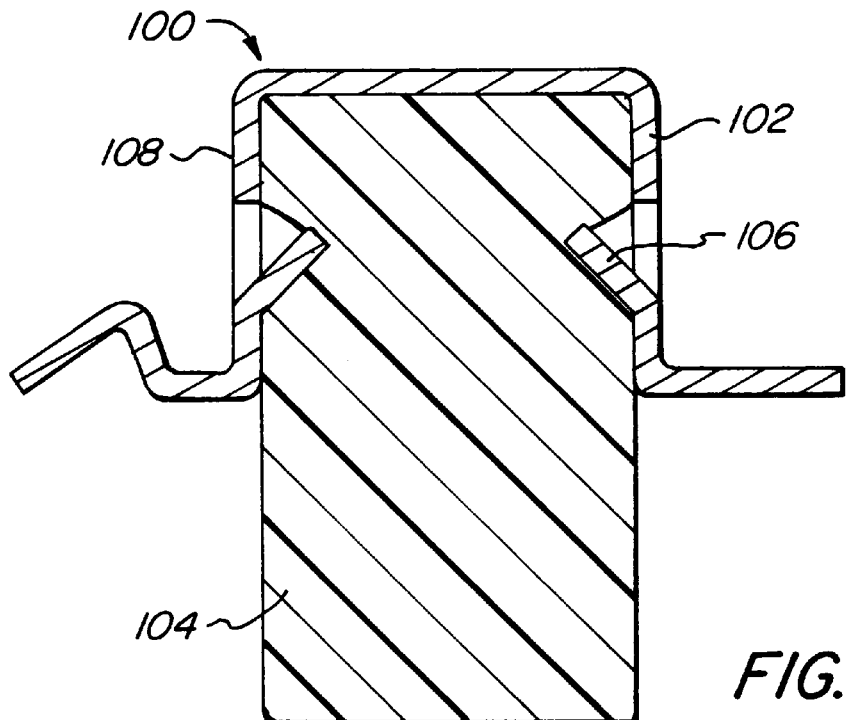
FIG. 1 is a partially cross-sectional view of a prior art jounce bumper assembly.

Referring now to FIGS. 2 through 5, a jounce bumper assembly 10 in accordance with the present invention is shown. The jounce bumper assembly 10 includes a mounting plate 12 with at least one, but preferably two, proturbances 14 extending from a face 16 thereof. A bumper 18 is molded around mounting plate 12 such that the ends 20 of proturbances 14 extend out from bumper 18 (best seen in FIG. 2). Bumper 18 is disposed within a mounting cup 22 having a recess 24 sized and shaped to receive bumper 18. Recess 24 has at least one, but preferably two, holes 26 passing therethrough corresponding to proturbances 14 such that ends 20 of proturbances 14 pass through holes 26 (shown in FIG. 5). Ends 20 of proturbances 14 passing through holes 26 are deformed radially outwardly such that bumper 18 is fixed within recess 24 of mounting cup 22 (also shown in FIG. 5).

Figure 2:
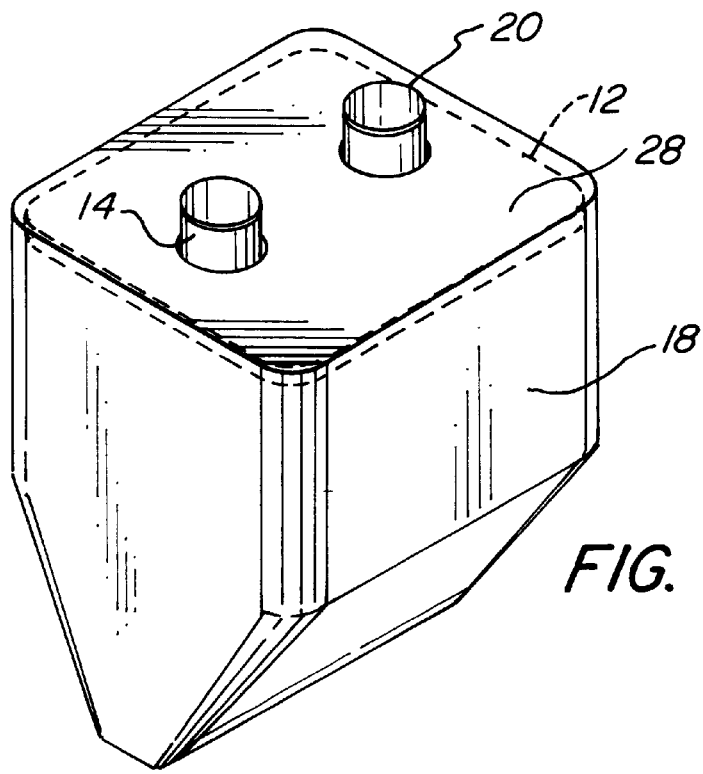
FIG. 2 is an isometric view of a portion of a jounce bumper assembly in accordance with the present invention, with a portion thereof shown in phantom.
Figure 3:
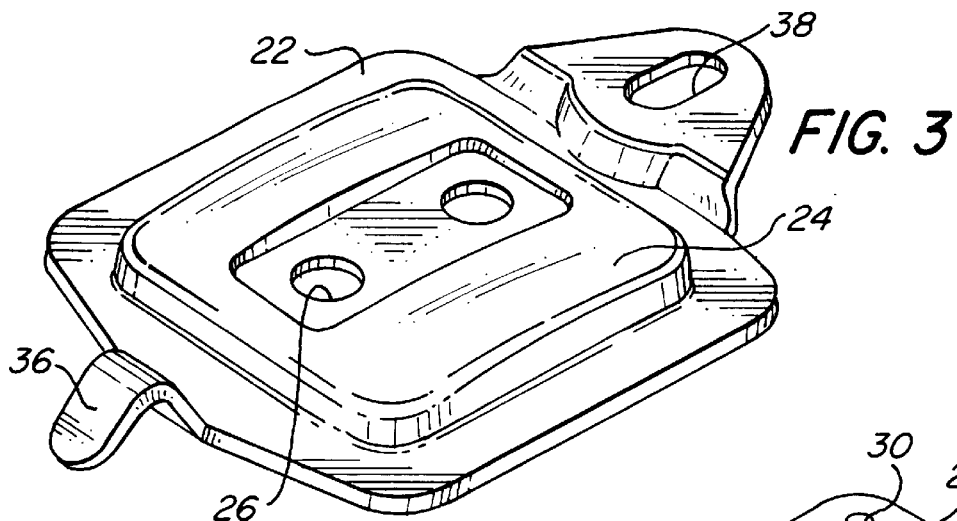
FIG. 3 is an isometric view of another portion of a jounce bumper assembly in accordance with the present invention.
Figure 4:
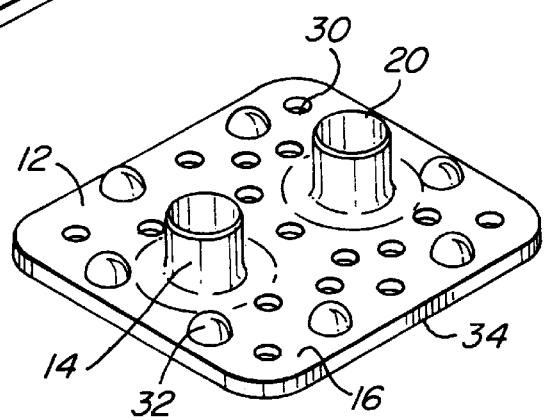
FIG. 4 is an isometric view of another portion of a jounce bumper assembly in accordance with the present invention.
Figure 5:
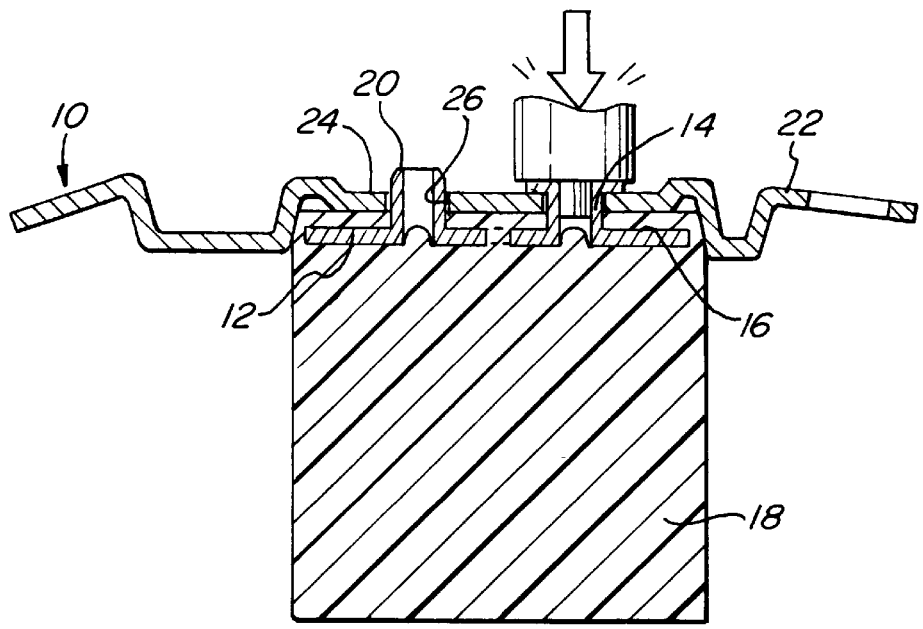
FIG. 5 is a partially cross-sectional view of a jounce bumper assembly in accordance with the present invention illustrating portions thereof being joined together.

Bumper 18 is preferably molded from a microcellular polymeric material, with microcellular urethane being most preferred. Such a microcellular urethane material is commonly known and is readily available under the name MCU from the Freudenberg-NOK Company. It is contemplated that bumper 18 may have any of numerous shapes, although a preferred configuration is illustrated in the Figures. In this preferred configuration, the base 28 of bumper 18 has a cross-section which is substantially rectangular with rounded corners, as is best seen in FIG. 2.

Mounting plate 12 has a shape substantially the same as the shape of base 28 of bumper 18, but with smaller dimensions. Thus, when bumper 18 is molded around mounting plate 12, mounting plate 12 is substantially fully encased within bumper 18, except for proturbances 14 (best seen in FIG. 2). Preferably, proturbances 14 are extruded from mounting plate 12 and have a substantially tubular configuration. Mounting plate 12 preferably has a plurality of holes 30 passing therethrough. Holes 30 act to facilitate the flow of material around mounting plate 12 during molding and act to strengthen the attachment between mounting plate 12 and bumper 18 by allowing the molding material on either side of mounting plate 12 to form a plurality of fingers therethrough. These fingers inhibit relative movement between mounting plate 12 and bumper 18 even under the high shear stresses associated with repeated impacts. Similarly, mounting plate 12 preferably includes a plurality of protrusions 32 on face 16. These protrusions 32 are preferably formed by punch stamping the face 34 of mounting plate 12 opposite face 16. Thus, each protrusion 32 on face 16 has a corresponding recess (not shown) in face 34. Protrusions 32 and their corresponding recesses act to further strengthen the attachment between mounting plate 12 and bumper 18, as during molding the material used to form bumper 18 encases protrusions 32 and fills their corresponding recesses, which arrangement further inhibits relative movement between mounting plate 12 and bumper 18.

Mounting cup 22 is preferably stamped from a sheet of metallic material. Recess 24, which is stamped in mounting cup 22 is sized and shaped to receive bumper 28 with mounting plate 12 embedded therein. Preferably bumper 28 fits snugly into recess 24. Holes 26 are sized, shaped and located to receive proturbances 14 when bumper 28 is disposed in recess 24. Proturbances 14 pass through holes 26, and the ends 20 thereof are widened to a dimension greater than the dimension of holes 26 so that proturbances 14 hold bumper 28 within recess 24. In the preferred embodiment, when proturbances 14 have a substantially tubular configuration, ends 20 of proturbances 14 are deformed radially outwardly, preferably by either orbital spinning or cold staking, to accomplish the attachment of bumper 18 to mounting cup 22 (illustrated in FIG. 5). By using this attachment means, recess 24 in mounting cup 22 need only be deep enough to inhibit relative sliding between bumper 18 and mounting cup 22, and is on the order of a fraction of an inch.

Jounce bumper assembly 10 is attached to a component of the automotive suspension system at a point where impact is likely to occur. For example, where impact is anticipated between the frame of the vehicle and the axle, jounce bumper assembly 10 may be attached to the frame. This attachment may be accomplished, for example, by providing mounting cup 22 with a tongue 36 and a hole 38. To mount jounce bumper assembly 10 to the frame, tongue 36 would be inserted in a slot (not shown) provided in the vehicle frame and a bolt would be passed through hole 38. Hole 38 may be slotted to allow for some dimensional variances.

The present invention, therefore, provides a jounce bumper assembly for cushioning the impact between two components of an automotive suspension system, which can be disposed between suspension system components even when little space is provided therebetween, and which can withstand the stresses associated with repeated impacts.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A jounce bumper assembly comprising:

a mounting plate having at least one protuberance protruding from a face thereof;

a bumper molded around said mounting plate such that an end of the at least one protuberance extends out from said bumper, said bumper having a lower portion having a periphery; and, a mounting cup having a recess sized and shaped to correspond with the periphery of the lower portion of said bumper such that said bumper is snugly received within the recess so as to inhibit relative sliding between said bumper and said mounting cup, the recess having at least one hole corresponding to the at least one protuberance such that the end of the at least one protuberance passes through the at least one hole, the end of the at least one protuberance passing through the hole being widened such that said bumper is fixed within the recess of said mounting cup, said mounting cup also including a means for attaching the jounce bumper assembly to a frame, which means is independent of the at least one protuberance.

2. The jounce bumper assembly of claim 1 wherein said mounting plate has a plurality of holes passing therethrough.

3. The jounce bumper assembly of claim 1 wherein said mounting plate has a plurality of protrusions on the face thereof, and wherein the plurality of protrusions are encased within said bumper.

4. The jounce bumper assembly of claim 1 wherein the at least one protuberance comprises at least one substantially tubular protuberance, the end of the at least one substantially tubular protuberance passing through the at least one hole in the recess of said mounting cup being deformed radially outwardly.

5. The jounce bumper assembly of claim 1 wherein the at least one protuberance comprises two protuberances.

6. The jounce bumper assembly of claim 1 wherein said bumper is formed from a microcellular polymeric material.

7. The jounce bumper assembly of claim 6 wherein the microcellular polymeric material is microcellular urethane.

8. A jounce bumper assembly comprising:

a mounting plate having at least one substantially tubular protuberance protruding from a face thereof;

a microcellular polymeric bumper molded around said mounting plate such that an end of the at least one substantially tubular protuberance extends out from said bumper, said bumper having a lower portion having a periphery; and, a mounting cup having a recess sized and shaped to correspond with the periphery of the lower portion of said bumper such that said bumper is snugly received within the recess so as to inhibit relative sliding between said bumper and said mounting cup, the recess having at least one hole corresponding to the at least one substantially tubular protuberance such that the end of the at least one substantially tubular protuberance passes through the at least one hole, the end of the at least one substantially tubular protuberance passing through the hole being deformed radially outwardly such that said bumper is fixed within the recess of said mounting cup, said mounting cup also including a means for attaching the jounce bumper assembly to a frame, which means is independent of the at least one protuberance.

9. The jounce bumper assembly of claim 8 wherein said mounting plate has a plurality of holes passing therethrough.

10. The jounce bumper assembly of claim 8 wherein said mounting plate has a plurality of protrusions on the face thereof, and wherein the plurality of protrusions are encased within said bumper.

11. The jounce bumper assembly of claim 8 wherein the at least one substantially tubular protuberance comprises two substantially tubular protuberances.

12. The jounce bumper assembly of claim 8 wherein said microcellular polymeric bumper comprises a microcellular urethane bumper.

* * * * *